(12) United States Patent
Cook et al.

(10) Patent No.: US 8,753,600 B2
(45) Date of Patent: *Jun. 17, 2014

(54) METHODS OF PREPARING CLUSTERBORON

(75) Inventors: Kevin S. Cook, Carl Junction, MO (US); Mark Oxford, Eastern Passage (CA)

(73) Assignee: SemEquip, Inc., N. Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/008,724

(22) Filed: Jan. 18, 2011

(65) Prior Publication Data

US 2013/0236384 A1  Sep. 12, 2013

Related U.S. Application Data

(63) Continuation of application No. 12/741,200, filed as application No. PCT/US2008/012473 on Nov. 3, 2008, now abandoned.

(60) Provisional application No. 61/001,633, filed on Nov. 2, 2007.

(51) Int. Cl.
*C01B 6/10* (2006.01)

(52) U.S. Cl.
USPC .................................. 423/294; 423/295

(58) Field of Classification Search
USPC ................................... 423/294, 295
See application file for complete search history.

(56) References Cited

U.S. PATENT DOCUMENTS

| | | | |
|---|---|---|---|
| 2005/0163693 A1* | 7/2005 | Spielvogel et al. | 423/294 |
| 2005/0169828 A1* | 8/2005 | Spielvogel et al. | 423/294 |
| 2011/0165053 A1* | 7/2011 | Cook et al. | 423/294 |
| 2011/0195009 A1* | 8/2011 | Cook | 423/294 |

* cited by examiner

*Primary Examiner* — Wayne Langel
*Assistant Examiner* — Syed Iqbal
(74) *Attorney, Agent, or Firm* — Edwards Wildman Palmer LLP; Peter F. Corless

(57) ABSTRACT

New methods are provided for synthesis of ClusterBoron® ($B_{18}H_{22}$). Preferred methods of the invention include generation of the conjugate acid of $B_{20}H_{18}^{2-}$ and degradation of the acid in solution to produce $B_{18}H_{22}$ in high yields and high purity. The invention further provides isotopically enriched boranes, particularly isotopically enriched $^{10}B_{18}H_{22}$ and $^{11}B_{18}H_{22}$.

18 Claims, 2 Drawing Sheets

METHODS OF PREPARING CLUSTERBORON

RELATED APPLICATIONS

The present application is a Continuation of U.S. application Ser. No. 12/741,200, filed May 3, 2010, which is a 35 U.S.C. §371 U.S. national entry of International Application PCT/US2008/012473 (WO 2009/058408) having an International filing date of Nov. 3, 2008 which claims the benefit of U.S. provisional application No. 61/001,633 filed Nov. 2, 2007, all of which are incorporated by reference herein in their entirety.

The present application claims the benefit of U.S. provisional application No. 61/001,633 filed Nov. 2, 2007, which is incorporated by reference herein in its entirety.

BACKGROUND

1. Field of the Invention

The invention provides methods for synthesizing $B_{18}H_{22}$ as a mixture of syn and anti isomers, commonly marketed as ClusterBoron. The invention further provides isotopically enriched $B_{18}H_{22}$ prepared by the aforementioned methods. In particular, the invention relates the preparation of natural abundance $B_{18}H_{22}$, $^{10}B$-enriched $B_{18}H_{22}$ and $^{11}B$-enriched $B_{18}H_{22}$.

2. Background

Large boron hydride compounds have become important feed stocks for boron doped P-type impurity regions in semiconductor manufacture. More particularly, high molecular weight boron hydride compounds, e.g., boron hydride compounds comprising at least a five (5) boron atom cluster, are preferred boron atom feed stocks for molecular boron implantation.

An important aspect of modern semiconductor technology is the continuous development of smaller and faster devices. This process is called scaling. Scaling is driven by continuous advances in lithographic process methods, allowing the definition of smaller and smaller features in the semiconductor substrate which contains the integrated circuits. A generally accepted scaling theory has been developed to guide chip manufacturers in the appropriate resize of all aspects of the semiconductor device design at the same time, i.e., at each technology or scaling node. The greatest impact of scaling on ion implantation processes is the scaling of junction depths, which requires increasingly shallow junctions as the device dimensions are decreased. This requirement for increasingly shallow junctions as integrated circuit technology scales translates into the following requirement: ion implantation energies must be reduced with each scaling step. The extremely shallow junctions called for by modern, sub-0.13 micron devices are termed "Ultra-Shallow Junctions" or USJs.

Methods of manufacturing boron doped P-type junctions have been hampered by difficulty in controlling the ion-implantation process using boron. The single boron atom, being light (MW=10.8), can penetrate too deeply into a silicon substrate and diffuse throughout the substrate lattice rapidly during annealing or other elevated temperature processes.

Boron clusters or cages, e.g., boranes have been investigated as a feed stock for delivering molecular boron species to a semiconductor substrate with reduced penetration. See PCT/US03/20197.

Large boron hydride compounds, that is boron compounds having between 5 and about 100 boron atoms are preferred for use in molecular ion implantation methods for delivering boron atoms to a semiconductor substrate. Typically, there may be isomers of the boron hydride compound that exist. That is, boron hydrides with the same number of boron and hydrogen atoms that possess different chemical properties, e.g. structural isomers or stereoisomers. In addition, two or more structurally related boron hydride compounds having the same number of boron atoms but different numbers of hydrogen atoms have been isolated for various sized boron clusters. For example, pentaborane(9) and pentaborane(11) have chemical formulas of $B_5H_9$ and $B_5H_{11}$ respectively. Such compounds are frequently classified as closo ($B_nH_n$), nido($B_nH_{n+2}$), arachno ($B_nH_{n+4}$), hypho ($B_nH_{n+6}$), conjuncto ($B_nH_{n+8}$), and the like. Thus, different boron hydride species, including isomers and compounds containing various amounts of hydrogen, are frequently known for boron hydrides having n boron atoms. Jemmis, et al. have provided a review of various macropolyhedral boranes and known compounds having n boron atoms and various amounts of hydrogen.[1,2]

Mixtures of isomers and mixtures of n-boron atom containing boron hydrides are suitable for use in the implantation methods discussed. The molecular ions generated by the ionization process of boron hydride mixtures will have uniform and narrow weight distributions.

Current synthetic technologies for the preparation of large boron hydride molecules, e.g., boron hydride molecules with more than 12 boron atoms, are often plagued by complicated synthetic processes, low isolated yields, and/or inconsistent reproducibility.

Although there are several synthetic routes reported in the literature for the preparation of $B_{18}H_{22}$ as a mixture of isomers, they are lengthy, often result in notably low yields, are unreliable and have safety issues associated with the synthesis.

It thus would be desirable to have new methods for preparation of $B_{18}H_{22}$.

DESCRIPTION OF THE INVENTION

We have now discovered new methods for the preparation of octadecaborane, $B_{18}H_{22}$. The invention is particularly useful for facile synthesis and purification of large quantities of $B_{18}H_{22}$. The present invention also relates to isotopically-enriched $B_{18}H_{22}$. Whereas, by definition, enriched means the modification of the boron isotopes natural abundance. Depending on source natural abundance of the $^{10}B$ isotope ranges from 19.10% to 20.31% and natural abundance of the $^{11}B$ isotope ranges from 80.90% to 79.69%.

A typical $B_{18}H_{22}$ molecular ion beam contains a wide range of ion masses due to a varying number of hydrogen losses from the molecular ion as well as the varying mass due to the two naturally occurring isotopes. As mass selection is possible in an implanter device used in semiconductor manufacture, use of isotopically enriched boron in $B_{18}H_{22}$ can greatly reduce the spread of masses, thereby providing an increased beam current of the desired implantation species. Thus, $^{11}B$ and $^{10}B$ isotopically-enriched $B_{18}H_{22}$ is also of great interest.

In one aspect, the invention provides methods of synthesizing octadecaborane ($B_{18}H_{22}$), the method comprising (a) contacting the salt of borane anion $B_{20}H_{18}^{2-}$ with an acid to produce $H_2B_{20}H_{18}$●$xH_2O$; and then preferably (b) removing water from the reaction vessel in the presence of a $B_{18}H_{22}$ solubilizing solvent that remains essentially chemically inert in the system.

In certain aspects the invention provides synthesizing $B_{18}H_{22}$ by methods comprising the steps of:

(a) contacting the borane anion $B_{20}H_{18}^{2-}$ in solvent with an acidic ion-exchange resin to produce a solution of $H_2B_{20}H_{18} \bullet xH_2O$;
(b) concentrating the mixture comprising $H_2B_{20}H_{18} \bullet xH_2O$;
(c) removing water from the reaction vessel in the presence of a $B_{18}H_{22}$ solubilizing solvent that remains essentially chemically inert in the system;
(d) separating insoluble byproducts from the reaction mixture through (i) filtration and/or (ii) concentration of reaction solvent, dissolution of $B_{18}H_{22}$ into aliphatic solvent and filtration of byproducts;
(e) isolation of $B_{18}H_{22}$ through removal of solvent.

Such a preferred process is represented schematically in the flow chart (FIG. 2). Preferred methods of the invention are suitable to prepare isotopically pure $B_{18}H_{22}$ and mixtures of structural isomers of $B_{18}H_{22}$. That is, the method of the invention, provide $B_{18}H_{22}$ capable of generating a suitable molecular ion beam for ion implantation and high purity $B_{18}H_{22}$ for use in other applications.

In some aspects of the invention, a solution of $B_{20}H_{18}^{2-}$ salt of the $B_{20}H_{18}^{2-}$ anion is contacted with an acid ion-exchange resin and the resulting solution is of $H_2B_{20}H_{18} \bullet xH_2O$ is concentrated by removal of the majority of solvent. Preferred solvents or solvent mixtures in which both the $B_{20}H_{18}^{2-}$ salt and $H_2B_{20}H_{18} \bullet xH_{2O}$ are soluble but not destroyed. These solvents and solvent mixtures may include water, alcohols, nitriles, ethers, cyclic ethers, sulfones, and the like.

In some aspects of the invention, any acidic ion-exchange resin capable of exchanging cations of a borane anion with protons are suitable for use in the methods of synthesizing $B_{18}H_{22}$ provided by the invention. Preferred acidic ion-exchange resins include cross-linked, solvent-insoluble resins having a plurality of acidic functional groups capable of exchanging a proton for the cation of the borane salt. Certain preferred acidic ion-exchange resins include aromatic or partially aromatic polymers comprising a plurality of sulfonic acid residues and more preferably include such aromatic or partially aromatic polymers which are cross-linked.

$B_{18}H_{22}$ is produced by contacting the concentrate with a chemically inert solvent with simultaneous water removal from the system. Although not wishing to be bound by theory, conditions conducive to removal of water and other solvents of crystallization from the hydrated hydronium ion salt, $H_2B_{20}H_{18} \bullet xH_2O$ (where x is a positive real number), are also suitable to induce partial hydronium ion degradation. Typically, preferred degradation conditions include the use of Dean Stark trap, moisture traps, moisture scavengers or contacting the hydrated hydronium salt with one or more drying agents. Drying agents may include, but are not limited to molecular sieves, phosphorus pentoxide, alumina, silica, silicates and the like, or a combination thereof. Reaction solvents should not cause degradation to $B_{18}H_{22}$ or any starting materials or intermediates produced during the course of the reaction. These may include, but are not limited to aromatic and arene solvents, alkane solvents, ethers, sulfones, esters, and the like. Reaction temperatures to promote water removal from the system range from 0° C. to about 250° C.

In a preferred aspect, the invention provides synthesizing $B_{18}H_{22}$ by methods comprising the steps of:
(a) contacting the borane anion $B_{20}H_{18}^{2-}$ in an acetonitrile: water solvent mixture with an Amberlite acid ion-exchange resin to produce a solution of $H_2B_{20}H_{18} \bullet xH_2O$;
(b) concentrating the mixture comprising $H_2B_{20}H_{18} \bullet xH_2O$;
(c) removing water from the reaction vessel in the presence of a hot toluene (90° C. to 120° C.) through the use of a Dean Stark moisture trap (see for instance FIG. 2);
(d) separating insoluble byproducts from the reaction mixture through filtration;
(e) removal or concentration of toluene to leave crude $B_{18}H_{22}$ that is contaminated with boric acid and borates;
(f) dissolution of crude $B_{18}H_{22}$ into hexanes and filtration of insolubles;
(g) removal of hexanes to isolate $B_{18}H_{22}$ Preferred methods of the invention are suitable to provide $B_{18}H_{22}$ capable of generating a suitable molecular ion beam for ion implantation and high purity $B_{18}H_{22}$ for us in other applications.

The methods of synthesis, which provide $B_{18}H_{22}$ in high isolated yield (>50%) and with few synthetic procedures, are suitable for use in preparing isotopically enriched $B_{18}H_{22}$, e.g., the isotopic concentration of $^{10}B$ or 11B is greater than natural abundance. Preparation of isotopically enriched, $^{10}B$ or $^{11}B$, $B_{18}H_{22}$ is practical using the invention synthesis methods due to the limited number of synthetic steps, mass efficiency, and high overall synthetic yield (>65% from $B_{20}H_{18}^{2-}$).

Other aspects of the invention are disclosed infra.

DETAILED DESCRIPTION

Figure 1:
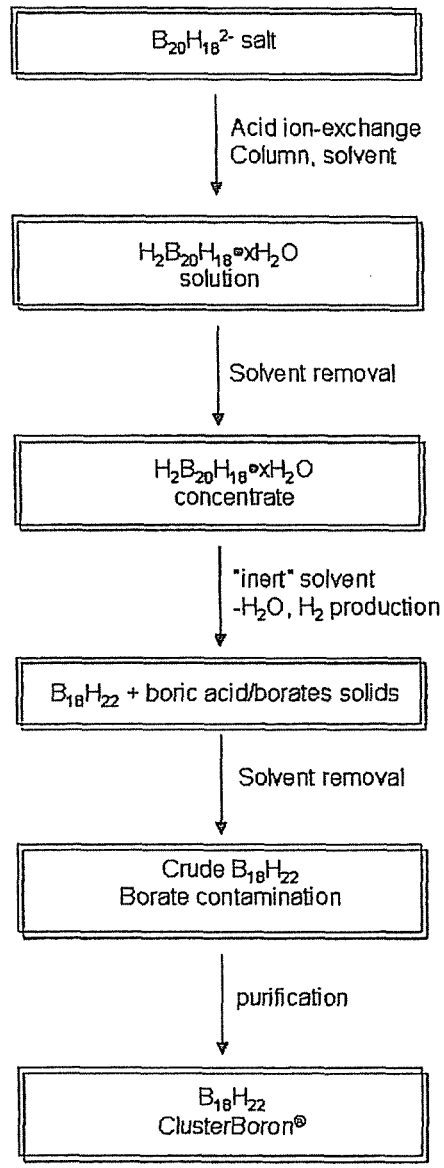
FIG. 1 shows schematically a preferred process of the invention.

FIG. 1 shows a specifically preferred process of the invention.

Figure 2:
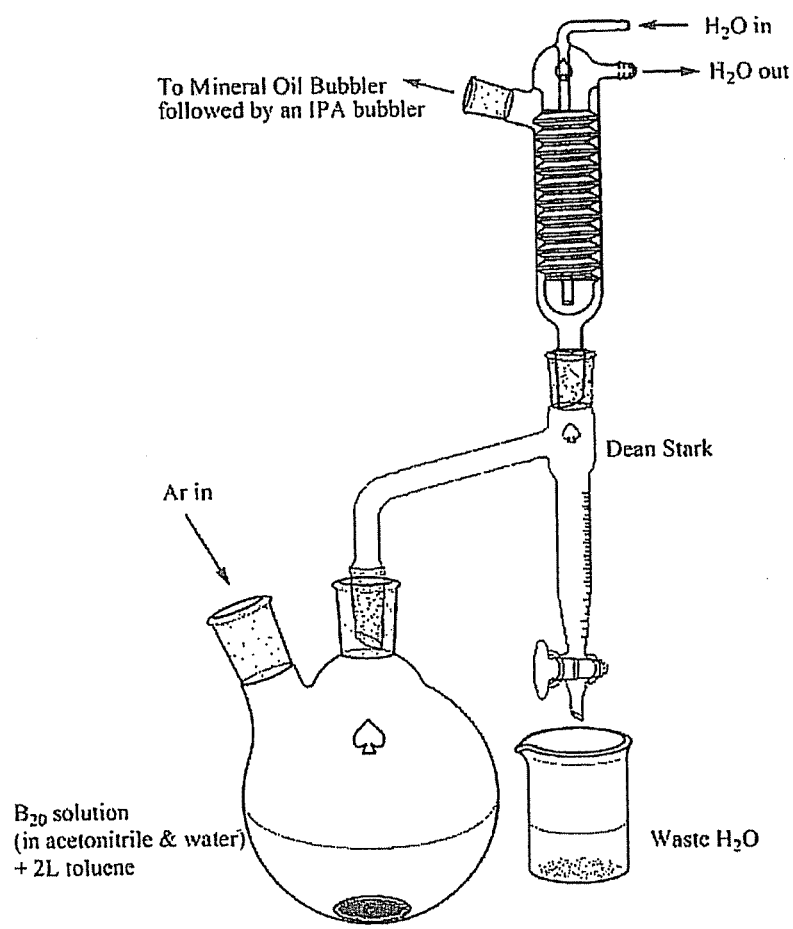
FIG. 2 shows use of a reaction set-up according to a preferred process of the invention.

As discussed above, in the above methods, water may be removed from the reaction mixture by a variety of methods including e.g. through the use of moisture traps, moisture scavengers, or more drying agents such as molecular sieves, phosphorus pentoxide, alumina, silica, silicates and the like, or a combination thereof. A Dean-Stark trap can be preferred such as illustrated in FIG. 2.

In methods of the invention wherein the isotopic concentration of $^{10}B$ atoms suitably may be greater than the natural abundance, e.g. wherein at least about 50% of the boron atoms present in the product $B_{18}H_{22}$ are $^{10}B$, or wherein at least about 80% of the boron atoms present in the product $B_{18}H_{22}$ are $^{10}B$, or wherein at least about 90% of the boron atoms present in the product $B_{18}H_{22}$ are $^{10}B$, or wherein at least about 95% of the boron atoms present in the product $B_{18}H_{22}$ are $^{10}B$, or wherein at least about 99% of the boron atoms present in the product $B_{18}H_{22}$ are $^{10}B$.

In the methods of the invention, the isotopic concentration of $^{11}B$ atoms suitably may be greater than the natural abundance, e.g. wherein at least about 90% of the boron atoms present in the product $B_{18}H_{22}$ are $^{11}B$, or wherein at least about 95% of the boron atoms present in the product $B_{18}H_{22}$ are $^{11}B$, or wherein at least about 99% of the boron atoms present in the product $B_{18}H_{22}$ are $^{11}B$.

The invention now being generally described, it will be more readily understood by reference to the following example, which is included merely for purposes of illustration of certain aspects and embodiments of the present invention, and are not intended to limit the invention.

EXAMPLE 1

Re-crystallized but not dried $(HNEt_3)_2B_{20}H_{18} \bullet xH_2O$ prepared from $(HNEt_3)_2B_{10}H_{10}$ (333.0 g, 1.03 mol) is dissolved into 3 L of acetonitrile and 500 mL of water. The solution is then contacted with a 10 kg column of Amberlite IR-120 acid ion exchange resin. The $H_2B_{20}H_{18} \bullet xH_2O$ solution is eluted with a further 3 L of acetonitrile and eluent and washings combined. The mixture is concentrated to give a viscous yellow oil and the mixture transferred to the flask shown in FIG. 3. 1.5 L of toluene is added and the Dean Stark trap filled with additional toluene. After purging with argon for 45 minutes, the solution is brought to reflux with rapid stirring. Following the removal of most of the water from the reaction, hydrogen evolution significantly increases and precipitate begins to form. When hydrogen evolution ceases, the reaction is cooled and insolubles filtered away. The toluene solution is concentrated to dryness to give a light yellow powder that is extracted with 4 L of hexanes. Any insolubles are removed by filtration. The hexane solution is removed to leave white to off-white $B_{18}H_{22}$ (77.4 g, 69.1%).

EXAMPLE 2

Re-crystallized but not dried $(HNEt_3)_2{}^{11}B_{20}H_{18} \bullet xH_2O$ prepared from $(HNEt_3)_2{}^{11}B_{10}H_{10}$ (5.00 g, 15.4 mmol) is dissolved into 200 mL of acetonitrile and 25 mL of water. The solution is then contacted with a 500 g column of Amberlite IR-120 acid ion exchange resin. The $H_2{}^{11}B_2H_{18} \bullet xH_2O$ solution is eluted with a further 300 mL of acetonitrile and eluent and washings combined. The mixture is concentrated to give a viscous yellow oil and the mixture transferred to the flask shown in FIG. 3. 150 mL of toluene is added and the Dean Stark trap filled with additional toluene. After purging with argon for 45 minutes, the solution is brought to reflux with rapid stirring. Following the removal of most of the water from the reaction, hydrogen evolution significantly increases and precipitate begins to form. When hydrogen evolution ceases, the reaction is cooled and insolubles filtered away. The toluene solution is concentrated to dryness to give a light yellow powder that is extracted with 200 mL of hexanes. Any insolubles are removed by filtration. The hexane solution is removed to leave white to off-white $^{11}B_{18}H_{22}$ (1.17 g, 69.0%). $^{11}B$ enrichment was determined to be that of the starting material (>98.6% $^{11}B$ isotopic enrichment).

The invention has been described in detail with reference to preferred embodiments thereof. However, it will be appreciated that those skilled in the art, upon consideration of the disclosure, may make modifications and improvements within the spirit and scope of the invention.

REFERENCES

1. Jemmis, E. D.; Balakrishnarajan, M. M.; Pancharatna, P. D., Electronic Requirements for Macropolyhedral Boranes. *Chem. Rev.* 2002, 102, 93-144.
2. Jemmis, E. D.; Balakrishnarajan, M. M.; Pancharatna, P. D., A unifying Electron-Counting Rule for Macropolyhedral Boranes, metallaboranes, and Metallocenes. *J. Amer. Chem. Soc.* 2001, 123, 4313-4323.
3. Pitochelli, A. R.; Hawthorne, M. F., The Preparation of a New Boron Hydride $B_{18}H_{22}$. *J. Amer. Chem. Soc.* 1962, 84, 3218.
4. Hawthorne, M. F.; Pilling, R. L.; Stokely, P. F., The preparation and rearrangement of the three isomeric $B_{20}H_{18}{}^{4-}$ ions. *J. Am. Chem. Soc.* 1965, 87, 1893-1899.
5. Olsen, F. P.; Vasavada, R. C.; Hawthorne, M. F., The chemistry of n-$B_{18}H_{22}$ and i-$B_{18}H_{22}$. *J. Am. Chem. Soc.* 1968, 90, (15), 3946-3951.
6. Chamberland, E. L.; Muetterties, E. L., Chemistry of Boranes. XVIII. Oxidation of $B_{10}H_{10}{}^{-2}$ and its derivatives. *Inorg. Chem.* 1964, 3, 1450-1456.

All of the patents and publications cited herein are hereby incorporated by reference.

Those skilled in the art will recognize, or be able to ascertain using no more than routine experimentation, many equivalents to the specific embodiments of the invention described herein. Such equivalents are intended to be encompassed by the following claim.

What is claimed is:

1. A method of synthesizing octadecaborane ($B_{18}H_{22}$), the method comprising:
    (a) contacting the salt of borane anion $B_{20}H_{18}{}^{2-}$ in a reaction solvent with an acid to produce a solution of $H_2B_{20}H_{18} \bullet xH_2O$, wherein the reaction solvent is between about 80% and about 95% acetonitrile by volume;
    (b) concentrating the mixture comprising $H_2B_{20}H_{18} \bullet xH_2O$;
    (c) removing water from the reaction vessel in the presence of a $B_{18}H_{22}$ solubilizing solvent that remains essentially chemically inert in the system, wherein the solubilizing solvent comprises an arene compound; and
    (d) separating insoluble byproducts from the reaction mixture through (i) filtration and/or (ii) concentration of reaction solvent, dissolution of $B_{18}H_{22}$ into a dissolution solvent and filtration of byproducts.

2. The method of claim 1 further comprising isolating $B_{18}H_{22}$ through removal of solvent.

3. The method of claim 1 wherein the $B_{20}H_{18}{}^{2-}$ salt is an alkyl ammonium salt with a cation formula of $[NR^1R^2R^3R^4]^+$, wherein
    $R^1$, $R^2$, and $R^3$ are independently selected from the group consisting of hydrogen, $C_{1-20}$alkyl, $C_{6-10}$aryl, $C_{7-10}$aralkyl, or any two of $R^1$, $R^2$, or $R^3$ taken in combination form a heterocyclic ring; and
    $R^4$ is selected from hydrogen, $C_{1-20}$alkyl, or $C_{6-10}$aryl.

4. The method of claim 1 wherein the acid is an organic acid having a pKa of less than about 2.

5. The method of claim 1 wherein the acid is an inorganic acid having a pKa of less than about 2.

6. The method of claim 1 wherein the reaction solvent of step (a) is a mixture of aqueous and non-aqueous solvents.

7. The method of claim 1 wherein the reaction solvent of step (a) is a mixture of 6:1 by volume acetonitrile:water.

8. The method of claim 1 wherein the solubilizing solvent of step (c) comprises, consists essentially of or consists of toluene or xylene.

9. The method of claim 1 wherein the solubilizing solvent of step (c) comprises hexanes.

10. The method of claim 1 wherein the dissolution solvent of step (d) is from the group consisting of alkanes, ethers, or a combination thereof.

11. The method of claim 1 wherein the dissolution solvent of step (d) comprises, consists essentially of or consists hexanes.

12. The method of claim 1 wherein the isotopic concentration of $^{10}B$ atoms is greater than the natural abundance.

13. The method of claim 1 wherein the isotopic concentration of $^{11}B$ atoms is greater than the natural abundance.

14. The method of claim 13 wherein at least about 90% of the boron atoms present in the product $B_{18}H_{22}$ are $^{11}B$.

15. The method of claim 1, wherein removing water from the reaction vessel takes place in the presence of toluene at a temperature of from 90° C. to 120° C. in a Dean Stark moisture trap.

16. A method of synthesizing octadecaborane ($B_{18}H_{22}$), the method comprising the steps of:
(a) contacting the salt of borane anion $B_{20}H_{18}^{2-}$ in solvent with acidic ion-exchange resin to produce a solution of $H_2B_{20}H_{18} \bullet xH_2O$, wherein the solvent is a mixture of 6:1 by volume acetonitrile:water;
(b) concentrating the mixture comprising $H_2B_{20}H_{18} \bullet xH_2O$;
(c) removing water from the reaction vessel in the presence of a $B_{18}H_{22}$ solubilizing solvent that remains essentially chemically inert in the system, wherein the solubilizing solvent comprises an arene compound;
(d) separating insoluble byproducts from the reaction mixture through (i) filtration and/or (ii) concentration of reaction solvent, dissolution of $B_{18}H_{22}$ into aliphatic solvent and filtration of byproducts; and
(e) isolation of $B_{18}H_{22}$ through removal of solvent.

17. The method of claim 16, wherein removing water from the reaction vessel takes place in the presence of toluene at a temperature of from 90° C. to 120° C. in a Dean Stark moisture trap.

18. A method of synthesizing octadecaborane ($B_{18}H_{22}$), the method comprising the steps of:
(a) contacting the borane anion $B_{20}H_{18}^{2-}$ in a 6:1 by volume acetonitrile:water solvent mixture with an Amberlite acid ion-exchange resin to produce a solution of $H_2B_{20}H_{18} \bullet xH_2O$;
(b) concentrating the mixture comprising $H_2B_{20}H_{18} \bullet xH_2O$;
(c) removing water from the reaction vessel in the presence of a hot toluene (90° C. to 120° C.) through the use of a Dean Stark moisture trap;
(d) separating insoluble byproducts from the reaction mixture through filtration;
(e) removal or concentration of toluene to leave crude $B_{18}H_{22}$ that is contaminated with boric acid and borates;
(f) dissolution of crude $B_{18}H_{22}$ into hexanes and filtration of insolubles; and
(g) removal of hexanes to isolate $B_{18}H_{22}$.

* * * * *